United States Patent
Dufosse et al.

(10) Patent No.: US 7,142,827 B2
(45) Date of Patent: Nov. 28, 2006

(54) STRUCTURAL ARRANGEMENT FOR A RADIO COMMUNICATION TERMINAL INCORPORATING A LOUDSPEAKER AND AN EARPIECE

(75) Inventors: Stephane Dufosse, Cormeilles en Parisis (FR); Jean-Christophe Villain, Colombes (FR); Eric Menu, Paris (FR); Yves Lebaudour, Franconville (FR)

(73) Assignee: TCL Communication Technology Holdings Limited, Hong Kong (CN)

( * ) Notice: Subject to any disclaimer, the term of this patent is extended or adjusted under 35 U.S.C. 154(b) by 493 days.

(21) Appl. No.: 10/654,011

(22) Filed: Sep. 4, 2003

(65) Prior Publication Data

US 2004/0048641 A1   Mar. 11, 2004

(30) Foreign Application Priority Data

Sep. 5, 2002   (FR)   ................... 02 10969

(51) Int. Cl.
*H04B 1/38*   (2006.01)
(52) U.S. Cl. ................... 455/90.3; 455/569.1; 381/335
(58) Field of Classification Search ............... 455/90.3, 455/128, 575.1, 569.1; 379/433.02; 381/334, 381/335, 342
See application file for complete search history.

(56) References Cited

U.S. PATENT DOCUMENTS

| | | | |
|---|---|---|---|
| 6,324,284 B1 | 11/2001 | Hawker et al. | |
| 2001/0014161 A1* | 8/2001 | Baiker et al. | ................. 381/59 |
| 2003/0068987 A1 | 4/2003 | Dufosse et al. | |

FOREIGN PATENT DOCUMENTS

| | | |
|---|---|---|
| DE | 100 52 909 A1 | 5/2002 |
| EP | 1 091 539 A2 | 4/2001 |
| EP | 1 294 051 A1 | 3/2003 |
| WO | WO00/38475 | 6/2000 |

* cited by examiner

*Primary Examiner*—Lee Nguyen
(74) *Attorney, Agent, or Firm*—Sughrue Mion, PLLC

(57) ABSTRACT

In a structural arrangement for radio communication terminals comprising a casing in which are disposed at least a first sound transducer having an earpiece function and a second sound transducer having a loudspeaker function, the two transducers being respectively connected to two opposite faces of a printed circuit card, and each transducer comprising at least one resonating membrane vibrating in a front acoustical cavity and a rear acoustical cavity. The rear acoustical cavities of the transducers communicate with each other via orifices formed in the printed circuit card to form a twin rear acoustical cavity.

10 Claims, 2 Drawing Sheets

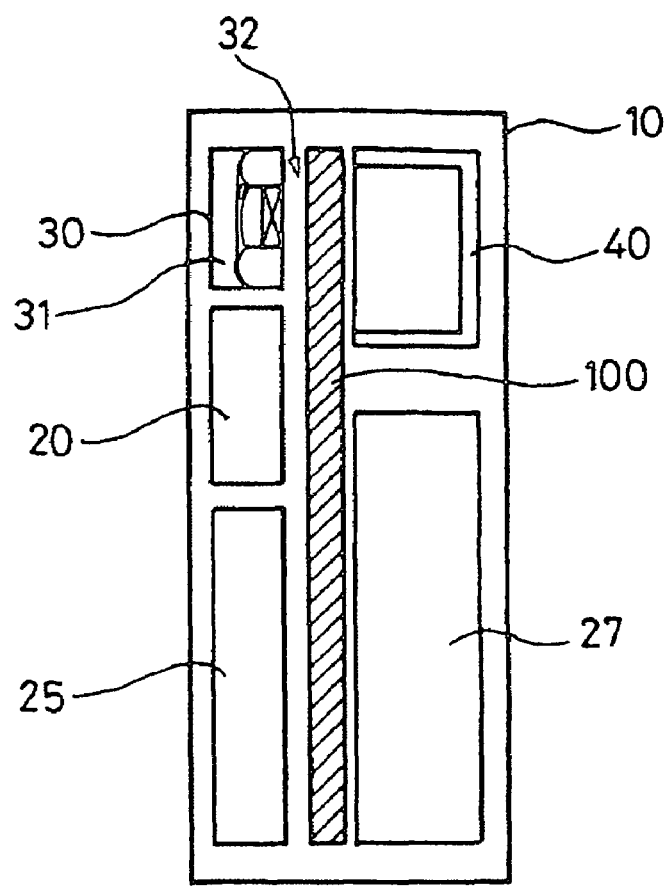
FIG_1    PRIOR ART
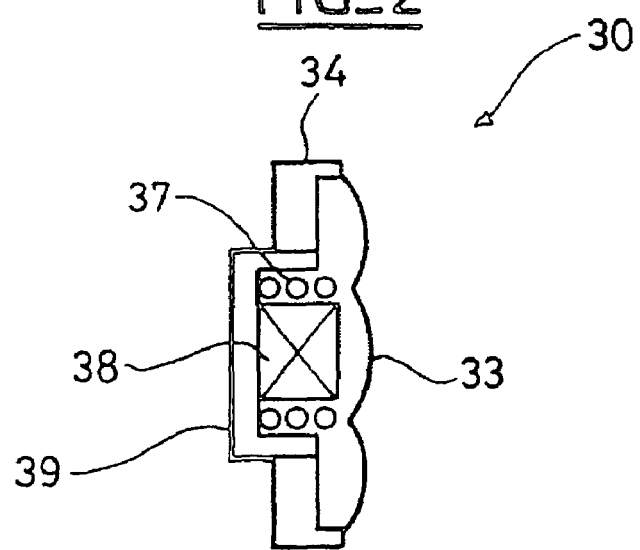
FIG_2    PRIOR ART

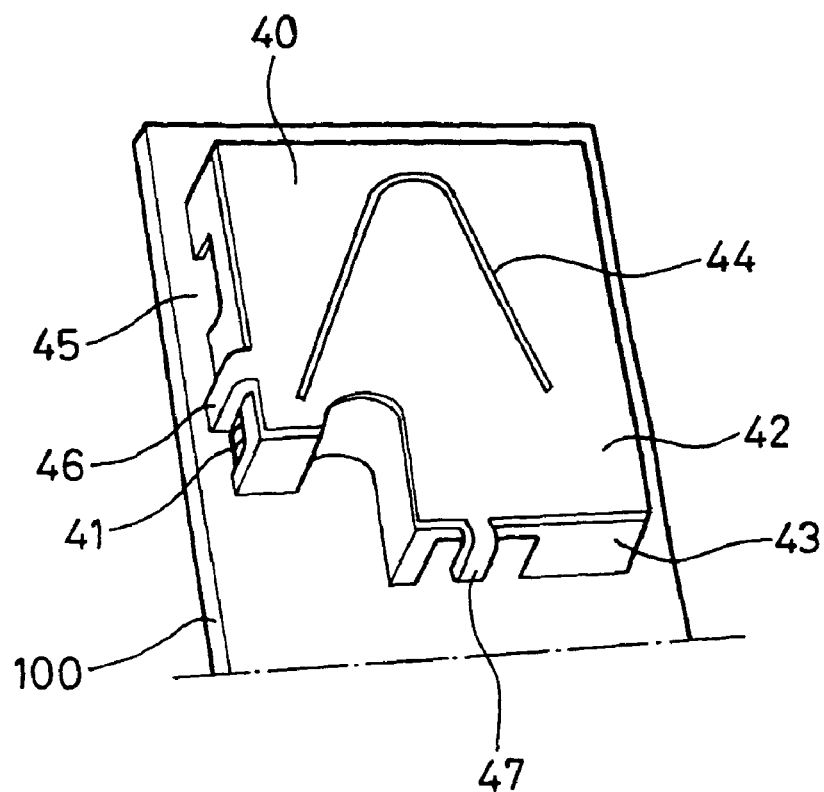
FIG_3
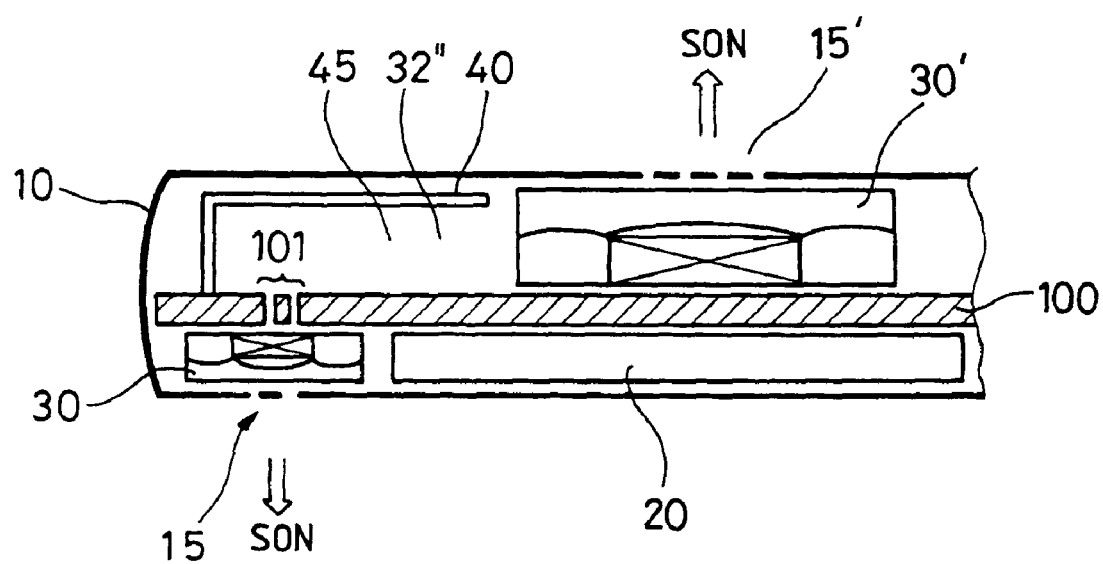
FIG_4

STRUCTURAL ARRANGEMENT FOR A RADIO COMMUNICATION TERMINAL INCORPORATING A LOUDSPEAKER AND AN EARPIECE

CROSS-REFERENCE TO RELATED APPLICATIONS

This application is based on French Patent Application No. 02 10 969 filed Sep. 5, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a structural arrangement for radio communication terminals.

2. Description of the Prior Art

The current trend is to produce radio communication terminals of small size that are functionally ergonomic and user friendly. A radio communication terminal mainly comprises a casing in which equipment units are housed, in particular a radio transceiver unit comprising at least an antenna and a man-machine interface unit generally including a keypad, a screen and a sound transducer.

The search for improved ergonomics and convenience has led to the antenna being accommodated inside the casing, for example, through the development of planar patch antennas. The same trend is encouraging the provision of increasingly comprehensive and increasingly larger man-machine interfaces.

FIG. 1 shows diagrammatically the various component parts of a radio communication terminal. This kind of terminal generally comprises a casing 10 made of a rigid insulative material or partly of metal and in which are disposed various components connected to a printed circuit card 100. The terminal comprises at least a screen 20, a keypad 25, a battery 27, an antenna 40 for establishing radio communication, and a transducer 30 for reproducing sound able to transform electrical signals supplied to it into sound waves.

The sound transducer 30 can have a number of functions, such as those of an earpiece, a loudspeaker and a ringer. The earpiece is essentially intended to be placed against the ear of a user when using the device to communicate, the ringer alerts the user to an incoming call or some other action, and the loudspeaker provides sound reproduction at a high volume, for example for hands-free applications. To reproduce the sound waves, the sound transducer 30 uses two separate acoustical resonance volumes respectively defining a front acoustical cavity 31 and a rear acoustical cavity 32 whose shapes and dimensions are chosen to achieve sound reproduction of sufficient quality for the application for which the transducer is intended. In particular, the size of the transducer 30 and the dimensions of the front and rear acoustical cavities 31 and 32 define the spectrum and the sound pressure level of the transducer. A rear cavity that is too small limits the sound spectrum at low frequencies, which reduces the sound pressure level at the bottom end of the spectrum.

FIG. 2 shows diagrammatically a sound transducer. In the conventional way, a transducer 30 includes a vibrating membrane 33 secured by attachments to the walls of a diaphragm 34 so as to be able to vibrate freely when acted on by a coil 37, to which it is attached, which is in turn caused to vibrate by a magnet 38 disposed on a metal support 39, such as a yoke.

Theoretically, the earpiece function necessitates a smaller component than a loudspeaker and ringer function, which must produce a higher sound volume. The volume used by a sound transducer 30 can be defined as the volume occupied by the component itself and the volume occupied by the acoustical cavities previously defined. The volume for correct operation of the transducer cannot be reduced below a particular limit imposed by the loudspeaker function.

As previously mentioned, the current trend is to enlarge the man-machine interface and in particular the screen, for example through the use of liquid crystal screens. Because the size of the keypad cannot be reduced, for reasons of convenience of use, the present invention proposes to use the space occupied by the sound transducer to enlarge the space available to receive a screen without reducing the size of the keypad or increasing the size of the mobile terminal.

The object of the invention is to eliminate the drawbacks of the prior art.

To this end, the invention proposes to retain only a simple earpiece on the front face of the terminal and to transfer the loudspeaker and ringer function to the rear of the terminal. To guarantee a good quality of sound reproduction, the rear acoustical cavities of the two transducers constituting the earpiece and the loudspeaker, communicate with each other. This feature is referred to hereinafter as a twin rear acoustical cavity.

SUMMARY OF THE INVENTION

The invention provides a structural arrangement for radio communication terminals comprising a casing in which are disposed at least a first sound transducer having an earpiece function and a second sound transducer having a loudspeaker function, the two transducers being respectively connected to two opposite faces of a printed circuit card, and each of the transducers comprising at least one resonating membrane vibrating in a front acoustical cavity and a rear acoustical cavity, in which structural arrangement the rear acoustical cavities of the transducers communicate with each other via orifices formed in the printed circuit card to form a twin rear acoustical cavity.

One embodiment of the terminal further comprises a planar patch antenna connected to the printed circuit card and having a cavity delimited by a ground plane and a conductive patch disposed on a dielectric support, and the twin rear acoustical cavity is contained at least partially in the cavity of the antenna.

In a different embodiment, at least one of the sound transducers is disposed in an opening in the printed circuit.

The features and advantages of the invention will become more clearly apparent on reading the following description which is given by way of illustrative and non-limiting example and with reference to the appended drawings.

BRIEF DESCRIPTION OF THE DRAWINGS

FIG. 1, already described, is a diagram showing the component parts of a radio communication terminal.

FIG. 2 is a diagram showing a sound transducer.

FIG. 3 is a diagram showing a planar patch antenna.

FIG. 4 is a diagram showing a structural arrangement in accordance with the invention.

DETAILED DESCRIPTION OF THE PREFERRED EMBODIMENT

The invention uses two separate transducers for the earpiece and loudspeaker/ringer functions, respectively. FIG. 4 is a diagram showing one arrangement in accordance with the present invention.

As previously mentioned, the volume necessary for correct operation of the earpiece transducer is smaller than the volume necessary for correct operation of the loudspeaker transducer. An earpiece transducer 30 is therefore disposed on the front of the casing 10 of the radio communication terminal, above an enlarged screen 20, such as a liquid crystal screen, for example. A loudspeaker/ringer transducer 30' is disposed on the rear of the casing 10 of the terminal, on the opposite side of the printed circuit card 100 to the first transducer 30.

In the conventional way, each of the transducers 30 and 30' has a front acoustical cavity 31, 31' and a rear acoustical cavity 32, 32' as previously defined. According to an essential feature of the invention, the rear acoustical cavities 32, 32' of the transducers 30, 30' communicate with each other to form a twin rear acoustical cavity 32". In particular, orifices 101 are formed in the printed circuit card 100 to enable this communication between the rear cavities 32 and 32'.

The orifices 101 providing for the formation of the single twin rear acoustical cavity 32" can be holes in the printed circuit card 100, with appropriate shapes and sizes, or notches in the edges of the card and forming spaces between the printed circuit card 100 and the casing 10 of the terminal.

The twin rear acoustical cavity 32" therefore has dimensions larger than those of each of the rear cavities 32, 32' in isolation. This increased acoustical volume for each of the transducers 30, 30' improves the sound quality of the transducers, and in particular widens the bandwidth and increases the sound pressure level.

In one embodiment, at least one of the sound transducers can be disposed in an opening in the printed circuit card. For example, the yoke and a portion of the diaphragm of the transducer are disposed in an opening in the card. In this embodiment, the opening in the card incorporating one of the transducers replaces the orifices previously cited to provide for the formation of the twin rear acoustical cavity.

The casing 10 of the terminal has openings 15, 15' facing the front acoustical cavities 31, 31' of the transducers 30, 30' to allow outward propagation of sound waves.

In an advantageous embodiment, shown in FIG. 4, the terminal further includes a planar patch antenna.

A patch antenna is described with reference to FIG. 3. These antennas have been developed to replace the wire antennas conventionally used and are advantageously integrated into the casing of the radio communication terminal. The patch antenna 40 is disposed on one face of the printed circuit card 100 and has a cavity 45 delimited by two conductive structures, namely a ground plane 41 and a conductive patch 42 disposed on a dielectric support 43. The ground plane 41 can be a single plane member, such as a conductive layer deposited on the card 100, or a plurality of coplanar conductive members, possibly each formed on a different component. The conductive patch 42 is generally plane, but can be conformed as required, and held at a particular distance from the ground plane 41 by a rigid insulative support 43. The shapes and dimensions of the dielectric support 43 are the result of dimensional and structural considerations and are decided on by the person skilled in the art according to the intended applications.

In a preferred embodiment, the conductive patch 42 takes the form of a plane or quasi-plane conductive member consisting of an etched conductive layer carried by a thin substrate 43 or by a thin board. The patch 42 is extended by two bent or attached conductive patches 46, 47 which are positioned at its periphery so that one provides a short circuit function through its direct connection to the ground plane 41 and the other provides an antenna feeder function through its connection to a signal processing unit, not shown, of the radio transceiver equipment unit.

The antenna 40 is preferably of the dual band type. To enable this mode of operation the patch 42 consists of a plane conductive member in the central portion of which there is formed a slot 44 that passes through the thickness of the patch and has a spread U-shape. The slot 44 delimits two plane areas on the surface of the patch; a first of these areas, which is called the interior area, corresponds mainly to the part of the patch that is inside the U-shape, and the second of these areas, which is called the exterior area, extends over the remainder of the patch, beyond the interior area.

As the person skilled in the art knows, an arrangement of this kind achieves two resonances starting from the short circuit lug, one mostly in the interior area and the other mostly in the exterior area, and one being a substantially quarter-wave resonance in the upper band and the other a substantially quarter-wave resonance in the lower band, to enable the antenna to operate in the required two bands, the shapes and dimensions of the antenna being calculated accordingly, in a manner known to the person skilled in the art.

In an advantageous embodiment of the invention, shown in FIG. 4, the twin rear acoustical cavity 32" is at least partly contained in the electromagnetic cavity 45 of the patch antenna 40, without impeding the correct operation of the antenna.

The ground plane 41 must have openings in it aligned with the orifices 101 in the printed circuit card 100, but this discontinuity of the ground plane is minimized by the small size of the orifices, which have a diameter of the order of 1 mm to 2 mm, for example.

Furthermore, for better communication between the rear cavities 32 and 32' of the two transducers 30, 30', the dielectric support 43 of the antenna 40 is not completely closed in the ground plane. This kind of arrangement does not prejudice the correct operation of the antenna 40, since the conductive patch 42 retains the required shape and disposition, as described with reference to FIG. 3.

The invention claimed is:

1. A structural arrangement for radio communication terminals comprising a casing in which are disposed at least a first sound transducer having an earpiece function and a second sound transducer having a loudspeaker function, the two transducers being respectively connected to two opposite faces of a printed circuit card, and each of the transducers comprising at least one resonating membrane vibrating in a front acoustical cavity and a rear acoustical cavity, in which structural arrangement the rear acoustical cavities of the transducers communicate with each other via orifices formed in the printed circuit card to form a twin rear acoustical cavity.

2. The structural arrangement claimed in claim 1 wherein, the terminal further comprising a planar patch antenna connected to the printed circuit card and having a cavity delimited by a ground plane and a conductive patch disposed on a dielectric support, the twin rear acoustical cavity is contained at least partially in the cavity of the antenna.

3. The structural arrangement claimed in claim 2 wherein the ground plane of the antenna has holes in it.

4. The structural arrangement claimed in claim 3 wherein the orifices formed in the printed circuit card constitute an opening in the card and at least one of the sound transducers is disposed in the opening.

5. The structural arrangement claimed in claim 3 wherein the orifices are holes formed in the printed circuit card.

6. The structural arrangement claimed in claim 2 wherein the orifices formed in the printed circuit card constitute an opening in the card and at least one of the sound transducers is disposed in the opening.

7. The structural arrangement claimed in claim 2 wherein the orifices are holes formed in the printed circuit card.

8. The structural arrangement claimed in claim 1 wherein the orifices formed in the printed circuit card constitute an opening in the card and at least one of the sound transducers is disposed in the opening.

9. The structural arrangement claimed in claim 1 wherein the orifices are holes formed in the printed circuit card.

10. The structural arrangement claimed in claim 1 wherein the orifices are notches formed between the printed circuit card and the casing of the terminal.

* * * * *